United States Patent [19]

Hosaka et al.

[11] 4,142,490

[45] Mar. 6, 1979

[54] HYBRID SPARK ADVANCE CONTROL APPARATUS FOR INTERNAL COMBUSTION ENGINES

[75] Inventors: Akio Hosaka, Yokohama; Shigeo Aono, Seki, both of Japan

[73] Assignee: Nissan Motor Company, Ltd., Japan

[21] Appl. No.: 733,704

[22] Filed: Oct. 19, 1976

[30] Foreign Application Priority Data

Oct. 22, 1975 [JP] Japan .................................. 50-126328

[51] Int. Cl.² ............................................. F02P 5/04
[52] U.S. Cl. ............................ 123/117 R; 123/117 A
[58] Field of Search ........ 123/117 R, 117 A, 146.5 A

[56] References Cited

U.S. PATENT DOCUMENTS

| | | | |
|---|---|---|---|
| 1,882,720 | 10/1932 | Arthur | 123/117 R |
| 3,145,324 | 8/1964 | Race | 123/117 R |
| 3,575,150 | 4/1971 | Habert | 123/117 R |
| 3,874,351 | 4/1975 | Asler et al. | 123/117 R |
| 3,885,534 | 5/1975 | Webster | 123/117 R |
| 3,910,243 | 10/1975 | Gau et al. | 123/146.5 A |
| 3,916,855 | 11/1975 | Fauser et al. | 123/117 R |
| 3,923,029 | 12/1975 | Polo | 123/117 R |
| 3,943,896 | 3/1976 | Green et al. | 123/146.5 A |
| 4,057,045 | 11/1977 | Stellwagen | 123/146.5 A |

OTHER PUBLICATIONS

S.E.V. Marchal Technical Document, "GT Distributor With Magnetic Timer", 9/75.

*Primary Examiner*—Charles J. Myhre
*Assistant Examiner*—Andrew M. Dolinar

[57] ABSTRACT

The spark advance control apparatus of the invention comprises a vacuum advance control mechanism and a speed advance control circuit. The vacuum advance control mechanism senses the vacuum pressure in the intake manifold of an internal combustion engine and generates an electrical pulse in advanced timing in relation to the sensed vacuum. The speed advance control circuit receives the pulse from the vacuum advance control mechanism, converts it into a voltage signal representative of the revolution of the engine crankshaft and generates an output voltage which varies nonlinearly as a function of the voltage signal. A pulse-width generator is provided having a first input connected to receive the pulse from the vacuum advance control mechanism and a second input connected to receive the nonlinear speed related voltage signal to generate a pulse which commences in response to the vacuum advance pulse and ends at a time determined by the speed related voltage signal. The trailing edge of the output from the pulse-width converter is utilized for ignition.

2 Claims, 7 Drawing Figures

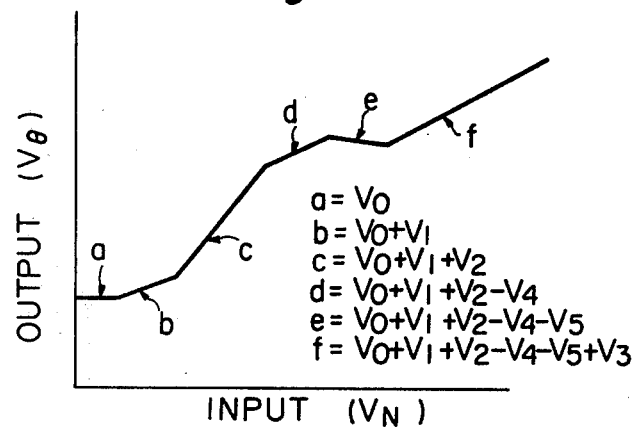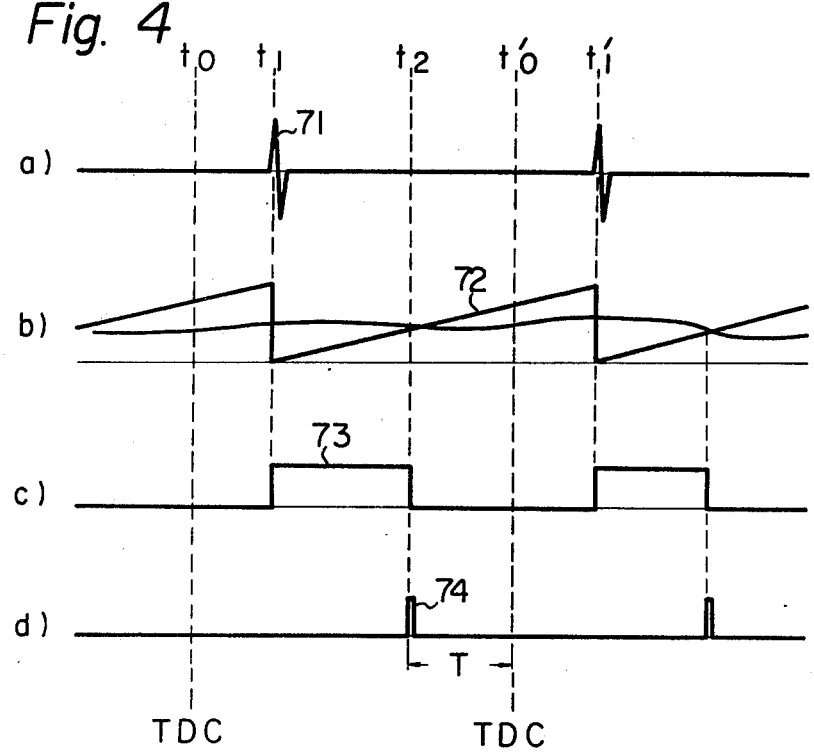

HYBRID SPARK ADVANCE CONTROL APPARATUS FOR INTERNAL COMBUSTION ENGINES

The present invention relates to spark advance control apparatus.

Conventional spark advance control apparatus are available in two types of construction, one being constructed entirely of mechanical components and the other being constructed entirely of electrical devices and circuits. Although the mechanically constructed apparatus is economical, it has a disadvantage in that the manufacturing tolerances of its components place limitations on the range of control, either in vacuum and speed, and give rise to difficulty in providing a desired nonlinear speed response characteristic in relation to engine operating parameters. The electrical advance control apparatus, though capable of nonlinear speed response characteristic, is costly because of the difficulty in providing an inexpensive vacuum sensing device or circuit comparable with the mechanical sensing device.

An object of the present invention is to provide a hybrid spark advance control apparatus in which vacuum advance control is effected by a mechanical sensing device and speed advance control is effected by an electrical circuit, so as to achieve a wide range of advance control in relation to engine speed while minimizing the apparatus cost.

In accordance with the present invention, there is provided a spark timing advance control apparatus for an internal combustion engine, which comprises an advance timing control mechanism for generating a first signal in response to a predetermined number of revolutions of the crankshaft of the engine such that the time of occurrence of said signal is variable in dependence on the load of the engine, an advance timing control circuit having means for converting the frequency of the first signals into a second signal of which the magnitude represents the frequency, and means for generating a third signal of which the magnitude varies in accordance with a predetermined characteristic as a function of the second signal from the converting means, a pulse-width converter responsive to the first signals from the advance timing control mechanism to generate a pulse of which the duration is dependent on the magnitude of the third signal from the advance timing control circuit, and means for detecting the trailing edge of the pulse to ignite a cylinder of the engine.

Specifically, the advance timing control mechanism comprises a diaphragm mounted within a housing to divide it into a first chamber communicated to the intake passage of the engine and a second chamber communicated to the atmosphere. The diaphragm is connected to one end of a support on which is mounted a magnetic core which will form a magnetic loop circuit with a pair of magnetic prongs extending from the circumference of a rotor rotatable with a predetermined number of revolutions of the engine crankshaft when both core and prongs come into proximity to each other at a particular ignition timing of the engine. A coil is wound on the core to generate an electrical pulse when a variation occurs in the magnetic flux in the core when the magnetic loop is formed. The other end of the support is pivoted at the center of revolution of the rotor so that the relative position of the core and rotor prongs is varied in response to the pressure difference in the first and second chambers, so that the occurrence of the electrical pulse is varied or advanced in relation to the top dead center of the associated cylinder.

The electrical speed advance control circuit comprises a frequency-to-voltage converter connected to receive the pulse supplied from the vacuum advance control mechanism to generate a voltage representative of the engine speed, and a function generator which has its input connected to the output of the frequency-to-voltage converter and its output connected to a pulse-width converter to which is also applied the electrical pulses from the vacuum advance control mechanism.

The function generator comprises a plurality of operational amplifiers each having a particular linear input-output characteristic determined by the ratio of resistances connected to the inverting input and output of each operational amplifier and by a DC control voltage applied to the inverting input. The inverting input of each operational amplifier is connected together through a respective input resistor to the output of the frequency-to-voltage converter, the output of each amplifier being connected together through a respective one of resistors to the inverting input of an adder or subtractor. The output from the adder/subtractor is an approximation of a desired nonlinear curve by a plurality of line segments provided by the operational amplifiers.

The pulse-width converter generates a pulse with a duration which is dependent on the voltage signal from the speed advance control circuit in response to the pulse supplied from the vacuum advance control mechanism. A monostable multivibrator of a trailing-edge triggered type is connected to the output of pulse-width converter to generate a spike pulse. The spike pulse thus occurs at a delayed timing from the previous top dead center in relation to the vacuum in the intake manifold and the engine speed so that ignition occurs in an advance of the following top dead center.

The invention will be further described by way of example in connection with the accompanying drawings, in which:

FIG. 3 is a graphic representation of the nonlinear speed response characteristic provided by the speed advance control circuit of FIG. 2;

FIG. 4 is a series of waveforms appearing at various points of the circuit of FIG. 1;

Figure 1:
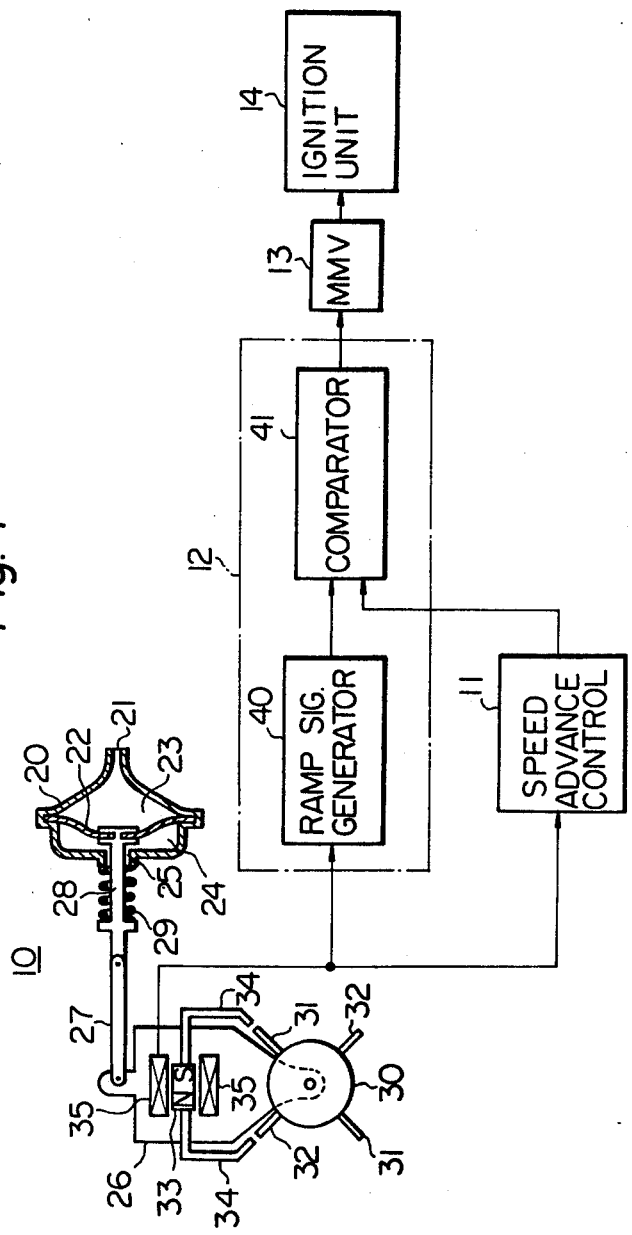
FIG. 1 is an embodiment of the invention partly in schematic form.

Referring now to FIG. 1, the spark advance control circuit of the invention is shown in schematic form and comprises generally a vacuum advance control mechanism 10, a speed advance control circuit 11 and a pulse-width converter 12 whose output is coupled to a monostable multivibrator 13 which supplies ignition pulses to an ignition unit 14.

The vacuum advance mechanism 10 comprises a vacuum sensing unit 20 having an orifice 21 through which the interior of the unit is in communication with the intake manifold (not shown). Inside the sensing unit 20 is disposed a diaphragm 22 which divides the interior of the unit into a first chamber 23 communicated with the intake manifold and a second chamber 24 which is communicated with the atmosphere through an opening 25. The diaphragm 22 is connected to a support plate 26 by means of connecting rods 27 and 28 which is urged toward the support plate by a compression spring 29. The support plate 26 is pivoted at the axis of a rotor 30 having diametrically disposed magnetic prongs 31 and 32 in pairs. Mounted on the support plate 26 are a permanent magnet 33 having a pair of curved arms 34 to provide a magnetic circuit through the magnetic prongs 31 and 32 and the rotor 30 and a pair of coils 35 adjacent the magnet 33. The rotor 30 has its axis connected to the engine crankshaft (not shown) for rotation therewith. The magnetic circuit will be interrupted at intervals as the rotor 30 revolves at half the speed of the crankshaft, thereby generating pulses from the coil 35 representing the engine speed. The diaphragm 22 varies its position in response to the difference in pressure between the first and second chambers 23 and 24 to cause pivotal movement of the support plate 26 about the axis of the rotor 30, and hence the arms 34 with respect to the prongs 34 of rotor 30. As many prongs are provided on the rotor 30 as there are cylinders so that each prong corresponds to each cylinder. For a six-cylinder engine, a set of six prongs may be provided to generate an electrical pulse for each cylinder at each revolution of the crankshaft. The pulse from the vacuum advance control 10 thus occurs at a point in time which is variable in accordance with the vacuum pressure in the intake manifold and hence with the engine load with respect to the top dead center of each cylinder.

The pulse-width converter 12 includes a ramp signal generator 40 which generates a sawtooth or triangular wave signal in response to an input signal applied thereto, and a comparator 41 having one input connected to the output of ramp signal generator 40 and the second input connected to the output of speed advance control circuit 11 for comparison therebetween. The comparator 41 generates an output when the output from the speed advance control circuit 11 is above the sawtooth wave output from the ramp generator 40. The speed advance control 11 provides a voltage signal whose amplitude varies nonlinearly as a function of the interval between successive pulses from the vacuum advance control mechanism 10, and hence to the speed of the engine. The nonlinear characteristic of the speed advance control 11 is provided by a plurality of operational amplifiers or comparators as will be described later. The duration of the comparator 41 output is thus a function of the time during which the voltage output from the speed advance control 11 is above the ramp generator 40 output, so that the pulse-width converter 12 generates an output pulse whose duration or width is dependent on the output of speed advance control 11.

The monostable multivibrator 13 is of a trailing-edge triggered type so that it generates a spike pulse at the trailing edge of the pulse from the pulse-width converter 12.

Figure 2:
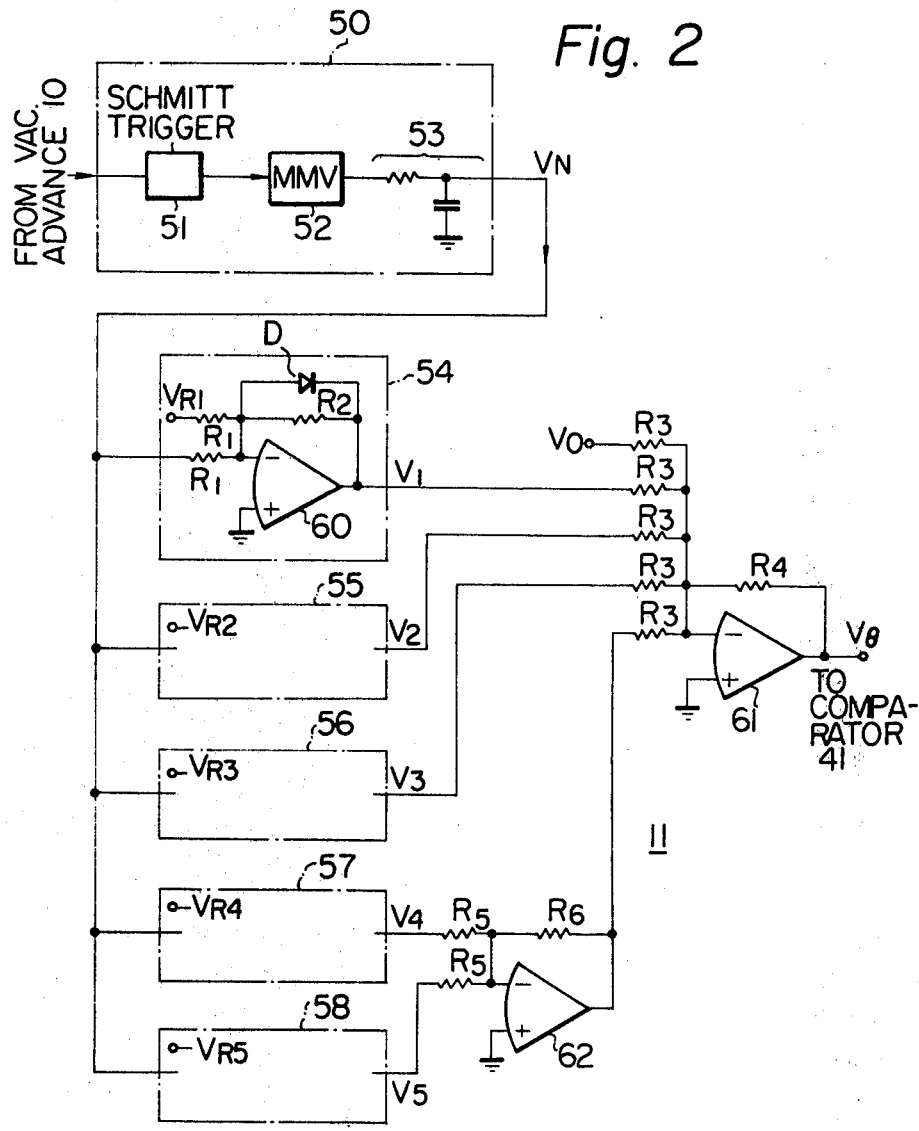
FIG. 2 is a detail of the speed advance control circuit of FIG. 1.

FIG. 2 shows the detail of the speed advance control circuit 11. The circuit 11 comprises a frequency-to-voltage converter 50 including a Schmitt trigger 51 having its input connected to the output of vacuum advance control 10 and its output connected to a monostable multivibrator 52 whose output is connected to a low-pass filter 53. The lowpass filter 53 has its output connected to a function generator formed by a plurality of operational amplifier circuits 54 to 58. Each of the circuits 54 to 58 comprises an operational amplifier 60 having its inverting terminal connected through a resistor $R_1$ to the output of frequency-to-voltage converter 50 and its noninverting input connected to the ground reference. The inverting input and output of each operational amplifier are connected by a feedback circuit including a resistor $R_2$ and a diode D connected in parallel with the resistor $R_2$ poled in a direction that permits a current to flow only from the inverting input to the output. The inverting input of operational amplifier 54 is connected to a source of reference voltage $V_{R1}$ through resistor $R_1$ of the same value as that of the resistor connected to the output of converter 50. Also, the inverting input of amplifiers 55 to 58 is connected through resistor $R_1$ to a respective one of reference voltage sources at $V_{R2}$ to $V_{R5}$. The output of amplifiers 54, 55 and 56 are then connected to a respective one of resistors $R_3$ of equal values to the inverting input of an operational amplifier 61 whose noninverting input is connected to the ground reference and whose output is connected through a resistor $R_4$ to the inverting input thereof.

To invert the polarity of the output from amplifier circuits 57 and 58, an operational amplifier 62 is provided having its inverting input connected through resistors $R_5$ to the output of amplifier circuits 57 and 58 and its noninverting input connected to ground. The output of amplifier 62 is connected through a resistor $R_6$ to its inverting input and further connected through resistor $R_3$ to the inverting input of operational amplifier 61. A DC voltage source at a potential of $V_0$ is also connected through resistor $R_3$ to the inverting input of amplifier 61.

Figure 5:
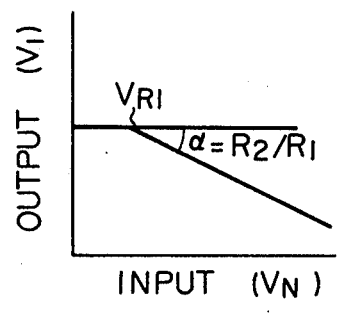
FIG. 5 is a input-output characteristic of an operational amplifier used in the circuit of FIG. 2.

The amplifier circuit 54 generates an output voltage whose amplitude is maintained constant until it reaches the reference voltage $V_{R1}$, whereupon it decreases linearly at a rate determined by the resistance ratio $R_2/R_1$ as shown in FIG. 5. By adjustment of the reference voltage $V_{R1}$ and the resistance ratio $R_2/R_1$, a desired output voltage $V_1$ is obtained from the amplifier 54 as a function of the input voltage $V_N$ from frequency-to-voltage converter 50. Similarly, by adjustment of reference voltages $V_{R2}$ to $V_{R5}$ and resistance ratios $R_2/R_1$ for each of the amplifiers 55 to 58, various input-output characteristics are obtained for output voltages $V_2$ to $V_5$ from the amplifiers 55 to 58.

The operational amplifier 61 serves to provide summation of all the input voltages applied thereto. The combined signal at the output of amplifier 61 can thus approximate a desired output curve as a function of input voltage by a plurality of line segments generated by the amplifiers 54 to 58. Therefore, the engine-speed related voltage from the output of frequency-to-voltage converter 50 undergoes a change in amplitude in accordance with a predetermined input-output curve. The output voltage $V_0$ from the summation amplifier 61 is shown in FIG. 3.

As illustrated in FIG. 4, the vacuum advance control pulse 71 in FIG. 4a occurs at time $t=t_1$ after an interval from time $t=t_0$ (Top dead center) in response to the vacuum pressure of the intake manifold. In response to the vacuum advance control pulse 71, a sawtooth wave signal 72 is generated which is below the output of speed advance control circuit 11 until at time $t=t_2$ (FIG. 4b). The time interval $t=t_1$ to $t=t_2$ is thus representative of the speed advance control signal. During that interval, the comparator 41 produces an output pulse 73 at the trailing edge of which is generated an ignition pulse 74. The ignition unit 14 is activated by the ignition pulse 74 so that ignition occurs at time $t=t_2$ which is advanced by a time interval T from time $t_2$ to time $t_0'$ at the next top dead center. Advance timing is thus obtained from the previous top dead center as a reference time by delaying the occurrence of ignition pulse in accordance with the vacuum pressure and the engine speed such that the time interval T in advance of the next top dead center is appropriately controlled in relation to the engine load and speed.

Figure 6:
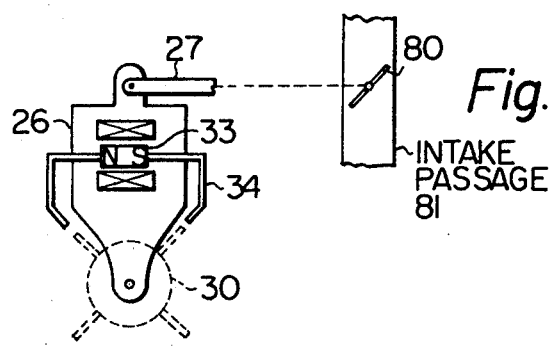
FIG. 6 is a modification of the vacuum advance control mechanism of FIG. 1.

In a modification of the advance control mechanism 10 of FIG. 1 shown in FIG. 6, the connecting rod 27 is operatively connected to the throttle valve 80 disposed in the intake passage 81 in such a manner that the connecting rod 27 is movable longitudinally in proportion to the throttle position so that the support plate 26 is pivotally moved by an amount proportional to the rotation of the throttle valve 80 about its axis.

Figure 7:
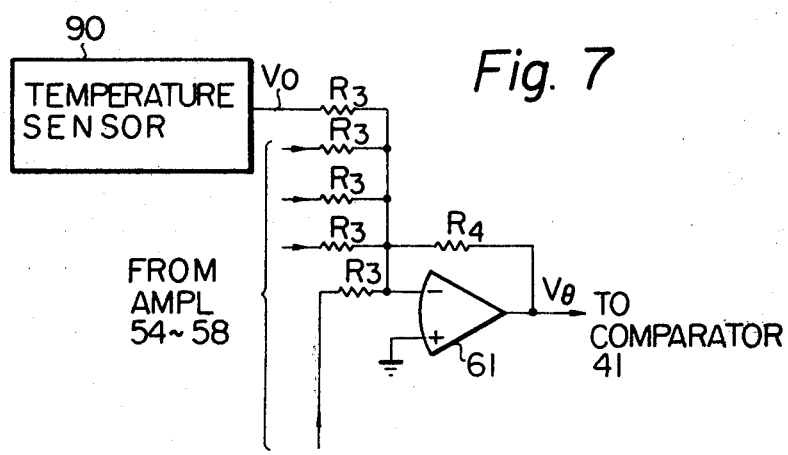
FIG. 7 is a modification of the speed advance control circuit of FIG. 2.

In FIG. 7, a temperature sensor 90 is provided to generate a DC or unidirectional voltage representative of the temperature of the internal combustion engine. The voltage indicates the operating condition of the engine and is applied to the inverting input of the adder 61 as the DC voltage $V_0$. The output of the adder 61 is thus variable not only with the output signals from the operational amplifiers 54 to 58, but also with the sensed temperature so that the ignition timing is also related to the sensed engine temperature.

What is claimed is:

1. A spark timing advance control apparatus for an internal combustion engine, comprising:

an advance timing control mechanism for generating first electrical pulses at intervals related to speed of revolutions of the crankshaft of the engine, the time of occurrence of said electrical pulses with respect to a reference point in time being variable in dependence on the load exerted on said engine;

converting means for converting the frequency of said first electrical pulses into a first signal of which the magnitude varies with said frequency, and means for generating a second signal of which the magnitude varies in accordance with a predetermined input-output characteristic as a function of the magnitude of said first signal;

a plurality of operational amplifiers each having first and second input terminals and an output terminal, the first input terminal of each operational amplifier being connected through a first resistor to the output of said converting means and through a second resistor to the output terminal thereof, the first input terminal of each operational amplifier being further connected through a third resistor of the same value as the first resistor to a DC voltage source, the second input of each operational amplifier being connected to a reference potential and the output terminal of each operational amplifier being connected to an adder-subtractor circuit, the DC voltage and the resistance ratio of the first to second resistor of each operational amplifier being chosen to provide a line segment of a curve to be approximated;

a pulse-width converter responsive to said first electrical pulses from the advance timing control mechanism to generate a second pulse of which the duration is dependent on the magnitude of said second signal and on the interval between successive ones of said first electrical pulses; and means for detecting the trailing edge of said second pulse to provide ignition in a cylinder of said engine.

2. An apparatus as claimed in claim 1, further comprising means for sensing the temperature of said engine to generate a unidirectional voltage representing the sensed temperature, and means for coupling the temperature representative voltage to said adder-subtractor circuit, whereby the output from the adder-subtractor is variable in accordance with the sensed temperature.

* * * * *